US012094649B2

(12) United States Patent
Choi

(10) Patent No.: US 12,094,649 B2
(45) **Date of Patent: *Sep. 17, 2024**

(54) COIL ELECTRONIC COMPONENT AND METHOD OF MANUFACTURING THE SAME

(71) Applicant: SAMSUNG ELECTRO-MECHANICS CO., LTD., Suwon-si (KR)

(72) Inventor: Min Sung Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 459 days.

This patent is subject to a terminal disclaimer.

(21) Appl. No.: 17/083,935

(22) Filed: Oct. 29, 2020

(65) Prior Publication Data

US 2021/0043375 A1 Feb. 11, 2021

Related U.S. Application Data

(63) Continuation of application No. 14/929,169, filed on Oct. 30, 2015, now Pat. No. 10,854,383.

(30) Foreign Application Priority Data

Mar. 9, 2015 (KR) ........................ 10-2015-0032396

(51) Int. Cl.
*H01F 41/04* (2006.01)
*H01F 17/00* (2006.01)
(Continued)

(52) U.S. Cl.
CPC ....... *H01F 41/041* (2013.01); *H01F 17/0013* (2013.01); *H01F 27/255* (2013.01); *H01F 27/292* (2013.01)

(58) Field of Classification Search
CPC ... H01F 17/0013; H01F 27/255; H01F 27/292
(Continued)

(56) References Cited

U.S. PATENT DOCUMENTS 2,412,668 A 12/1946 Bandur
3,526,708 A 9/1970 Leatherman
(Continued)

FOREIGN PATENT DOCUMENTS

CN 1241792 A 1/2000
CN 1292559 A 4/2001
(Continued)

OTHER PUBLICATIONS

First Office Action issued in Chinese Patent Application No. 201510783975.0, dated Jun. 19, 2018 (English translation).
(Continued)

*Primary Examiner* — Shawki S Ismail
*Assistant Examiner* — Joselito S Baisa
(74) *Attorney, Agent, or Firm* — Morgan, Lewis & Bockius LLP

(57) ABSTRACT

A coil electrode component includes a body including magnetic metal material, a coil disposed in the body and having first and second lead parts respectively outwardly exposed through first and second surfaces of the body. A first plating electrode is formed on the first surface of the body and a further surface of the body connected to and extended from the first surface of the body, and connected to the first lead part. A second plating electrode is formed on the second surface of the body and a further surface of the body connected to and extended from the second surface of the body, and connected to the second lead part.

12 Claims, 5 Drawing Sheets

I-I'

(51) Int. Cl.
*H01F 27/255* (2006.01)
*H01F 27/29* (2006.01)

(58) Field of Classification Search
USPC .......................................................... 336/200
See application file for complete search history.

(56) References Cited

U.S. PATENT DOCUMENTS

| | | | |
|---|---|---|---|
| 5,761,791 A | 6/1998 | Bando | |
| 6,154,112 A | 11/2000 | Aoba | |
| 6,194,248 B1 | 2/2001 | Amaya | |
| 6,292,139 B1 * | 9/2001 | Yamamoto | H01Q 1/38 430/315 |
| 6,437,676 B1 | 8/2002 | Takeda et al. | |
| 6,452,473 B1 * | 9/2002 | Suzuki | H01F 17/0013 336/200 |
| 6,600,219 B2 | 7/2003 | Higuchi | |
| 6,614,338 B2 | 9/2003 | Hamatani | |
| 6,725,525 B1 | 4/2004 | Shikama | |
| 6,841,191 B2 * | 1/2005 | Wu | C25D 5/022 29/613 |
| 7,154,367 B1 | 12/2006 | Chen | |
| 7,576,968 B2 * | 8/2009 | Ritter | H01G 4/30 361/321.1 |
| 7,719,398 B2 | 5/2010 | Tsuzuki | |
| 8,139,342 B2 * | 3/2012 | Takeuchi | H01G 4/2325 361/309 |
| 8,201,318 B2 | 6/2012 | Yamano | |
| 8,284,005 B2 * | 10/2012 | Yamamoto | H01F 17/0013 336/83 |
| 8,482,371 B2 | 7/2013 | Jeong et al. | |
| 8,824,165 B2 | 9/2014 | Chen | |
| 9,060,461 B2 | 6/2015 | Sawada | |
| 9,117,595 B2 | 8/2015 | Saito | |
| 9,269,486 B2 * | 2/2016 | Park | H01F 17/0013 |
| 9,583,251 B2 | 2/2017 | Moon | |
| 9,601,259 B2 | 3/2017 | Ozawa | |
| 9,613,753 B2 | 4/2017 | Maeda | |
| 9,711,273 B2 * | 7/2017 | Suzuki | H01F 27/2804 |
| 9,852,842 B2 | 12/2017 | Park | |
| 9,875,839 B2 | 1/2018 | Choi | |
| 9,892,833 B2 | 2/2018 | Jeong | |
| 10,879,005 B2 * | 12/2020 | Maki | H03H 1/00 |
| 11,342,110 B2 * | 5/2022 | Oh | H01F 17/0013 |
| 2001/0030595 A1 | 10/2001 | Hamatani et al. | |
| 2002/0110958 A1 | 8/2002 | Hamatani et al. | |
| 2002/0113680 A1 | 8/2002 | Kato | |
| 2006/0071749 A1 | 4/2006 | Aoki | |
| 2007/0242416 A1 | 10/2007 | Saito | |
| 2007/0285836 A1 | 12/2007 | Ono | |
| 2008/0257488 A1 | 10/2008 | Yamano | |
| 2009/0153282 A1 | 6/2009 | Taoka | |
| 2010/0092740 A1 | 4/2010 | Motoki et al. | |
| 2010/0123995 A1 | 5/2010 | Otsuka | |
| 2010/0188798 A1 | 7/2010 | Togashi | |
| 2011/0074231 A1 | 3/2011 | Soderberg | |
| 2011/0260825 A1 | 10/2011 | Doljack | |
| 2011/0291790 A1 * | 12/2011 | Okumura | H01F 27/292 336/200 |
| 2012/0274432 A1 * | 11/2012 | Jeong | H01F 27/2804 336/192 |
| 2013/0082812 A1 * | 4/2013 | Yoo | H01F 5/003 336/200 |
| 2013/0113593 A1 | 5/2013 | Jeong | |
| 2013/0222101 A1 | 8/2013 | Ito et al. | |
| 2013/0234819 A1 | 9/2013 | Yoo | |
| 2013/0249662 A1 | 9/2013 | Tonoyama et al. | |
| 2013/0293334 A1 | 11/2013 | Shin | |
| 2013/0293339 A1 | 11/2013 | Jeong | |
| 2013/0307655 A1 | 11/2013 | Saito | |
| 2013/0335186 A1 | 12/2013 | Chang | |
| 2014/0043129 A1 | 2/2014 | Wi et al. | |
| 2014/0062633 A1 | 3/2014 | Sim et al. | |
| 2014/0132385 A1 | 5/2014 | Maruyama | |
| 2014/0176286 A1 | 6/2014 | Okada | |
| 2014/0333407 A1 | 11/2014 | Otsubo | |
| 2015/0028983 A1 | 1/2015 | Ryu | |
| 2015/0036248 A1 | 2/2015 | Umeda | |
| 2015/0048915 A1 | 2/2015 | Yoon et al. | |
| 2015/0115776 A1 | 4/2015 | Terashita | |
| 2015/0155093 A1 * | 6/2015 | Kim | H01F 41/046 156/314 |
| 2015/0371752 A1 | 12/2015 | Park | |
| 2016/0307693 A1 | 10/2016 | Cho | |
| 2017/0162319 A1 * | 6/2017 | Otani | H01G 4/252 |
| 2018/0308620 A1 * | 10/2018 | Shinohara | H01F 27/2823 |
| 2019/0198221 A1 * | 6/2019 | Choi | H01F 27/36 |
| 2020/0168391 A1 * | 5/2020 | Yang | H01F 17/0013 |
| 2020/0365315 A1 * | 11/2020 | Kim | H01F 41/046 |
| 2022/0181065 A1 * | 6/2022 | Jung | H01F 27/2847 |
| 2022/0199315 A1 * | 6/2022 | Jung | H01F 27/292 |

FOREIGN PATENT DOCUMENTS

| | | | | |
|---|---|---|---|---|
| CN | 1313612 A | | 9/2001 | |
| CN | 1351359 A | | 5/2002 | |
| CN | 101051565 A | | 10/2007 | |
| CN | 101361146 A | | 2/2009 | |
| CN | 103366919 A | | 10/2013 | |
| CN | 103578721 A | | 2/2014 | |
| CN | 103680813 A | | 3/2014 | |
| CN | 203552846 U | | 4/2014 | |
| CN | 102760553 A | | 11/2015 | |
| CN | 108735431 A | * | 11/2018 | H01F 17/04 |
| CN | 111223649 B | * | 5/2023 | C25D 5/022 |
| JP | 2004-200373 A | | 7/2004 | |
| JP | 2007-067214 A | | 3/2007 | |
| JP | 2010-093113 A | | 4/2010 | |
| JP | 2012-094585 A | | 5/2012 | |
| JP | 2016018885 A | * | 2/2016 | H01F 27/255 |
| KR | 10-2012-0122589 A | | 11/2012 | |
| KR | 2013-0049207 A | | 5/2013 | |
| KR | 2015-0019730 A | | 2/2015 | |
| KR | 2019106620 A | * | 9/2019 | H01F 27/292 |
| WO | WO-2016093153 A1 | * | 6/2016 | H01F 17/0013 |

OTHER PUBLICATIONS

Korean Office Action dated Feb. 22, 2016 issued in corresponding Korean Patent Application No. 10-2015-0032396 (English translation).
Non-Final Office Action issued on Jan. 19, 2017 in U.S. Appl. No. 14/929,169.
Non-Final Office Action issued on Dec. 16, 2017 in U.S. Appl. No. 14/929,169.
Non-Final Office Action issued on Dec. 13, 2018 in U.S. Appl. No. 14/929,169.
Non-Final Office Action issued on Jun. 17, 2019 in U.S. Appl. No. 14/929,169.
Non-Final Office Action issued on Apr. 17, 2020 in U.S. Appl. No. 14/929,169.
Final Office Action issued on Jul. 27, 2017 in U.S. Appl. No. 14/929,169.
Final Office Action issued on Jun. 25, 2018 in U.S. Appl. No. 14/929,169.
Final Office Action issued on Jan. 17, 2020 in U.S. Appl. No. 14/929,169.
Notice of Allowance issued on Jul. 29, 2020 in U.S. Appl. No. 14/929,169.
The First Office Action issued on Dec. 1, 2020 in Chinese Patent Application No. 201910672409.0 (with English translation).

* cited by examiner

COIL ELECTRONIC COMPONENT AND METHOD OF MANUFACTURING THE SAME

CROSS-REFERENCE TO RELATED APPLICATION

This application is a continuation of U.S. patent application Ser. No. 14/929,169 filed on Oct. 30, 2015, now U.S. Pat. No. 10,854,383 issued on Dec. 1, 2020, which claims the benefit of priority to Korean Patent Application No. 10-2015-0032396 filed on Mar. 9, 2015, with the Korean Intellectual Property Office, the disclosures of each are incorporated herein by reference.

BACKGROUND

The present disclosure relates to a coil electronic component and a method of manufacturing the same.

An inductor, an electronic component, is a representative passive element configuring an electronic circuit, together with a resistor and a capacitor, to remove noise.

Among these, the inductor is manufactured by forming a coil in a body and forming external electrodes connected to the coil on outer surfaces of the body.

In accordance with recent changes such as increased complexity, multifunctionalization, thinness, or the like of a device, an attempt to reduce thickness of an inductor continues. Thus, there is a need for a technology able to secure high performance and reliability despite the trend toward slimming inductors.

SUMMARY

An aspect of the present disclosure may provide a coil electronic component capable of preventing contact defects between a coil and external electrodes and improving inductance by increasing a volume of a body, and a method capable of economically and efficiently manufacturing the coil electronic component.

According to an aspect of the present disclosure, a coil electronic component may include a body including a magnetic metal material, and a coil disposed in the body and having first and second lead parts respectively outwardly exposed to first and second surfaces of the body. A first plating electrode is formed on the first surface of the body and a further surface of the body connected to and extending from the first surface of the body, and connected to the first lead part. A second plating electrode is formed on the second surface of the body and a further surface of the body connected to and extending from the second surface of the body, and connected to the second lead part.

The first and second surfaces may be disposed to oppose each other while forming end surfaces of the body, and the further surface connected to the first surface may be the same surface as the further surface connected to the second surface and be provided as a mounting surface of the coil electronic component.

Lengths of portions of the first and second plating electrodes formed on the first and second surfaces may be longer than vertical distances from the mounting surface to the first and second lead parts, respectively.

Each of the lengths of the portions of the first and second plating electrodes formed on the first and second surfaces may be shorter than a thickness of the body.

The coil electronic component may further include an insulating layer formed on regions of outer surfaces of the body except for regions of the body on which the first and second plating electrodes are formed.

The coil electronic component may further include a surface electrode layer formed on the mounting surface of the body.

A surface step may be formed at an edge of the body at which a surface of the body opposing the mounting surface and the first or second surface meet.

The coil electronic component may further include a marking pattern formed on the mounting surface of the body or a surface of the body opposing the mounting surface of the body, and an insulating layer formed on regions of outer surfaces of the body except for regions of the body on which the first and second plating electrodes and the marking pattern are formed.

The first and second plating electrodes may include one or more selected from the group consisting of silver (Ag), palladium (Pd), aluminum (Al), nickel (Ni), titanium (Ti), gold (Au), copper (Cu), platinum (Pt), and tin (Sn).

The first and second plating electrodes may include a first plating layer which is in contact with the first and second lead parts, respectively, and second and third plating layers which are sequentially laminated on the first plating layer.

The first plating layer may be provided as a copper (Cu) plating layer, the second plating layer may be provided as a nickel (Ni) plating layer, and the third plating layer may be provided as a tin (Sn) plating layer.

The magnetic metal material may be provided in a particle form and be dispersed in a thermosetting resin.

The coil may include a first coil pattern disposed on one surface of an insulating substrate and a second coil pattern disposed on the other surface of the insulating substrate opposing the one surface of the insulating substrate.

According to another aspect of the present disclosure, a method of manufacturing a coil electronic component may include forming a coil having a first lead part and a second lead part. A body is formed by laminating magnetic sheets including a magnetic metal material on an upper portion and a lower portion of the coil. First and second plating electrodes are formed on outer surfaces of the body. The first plating electrode may be formed on a first surface of the body and a further surface of the body connected to and extending from the first surface of the body, and connected to the first lead part. The second plating electrode may be formed on a second surface of the body and a further surface of the body connected to and extending from the second surface of the body, and connected to the second lead part.

The method of manufacturing a coil electronic component may further include, before the forming of the first and second plating electrodes on the outer surfaces of the body, forming an insulating layer on regions of surfaces of the body except for regions of the body on which the first and second plating electrodes are formed.

The method of manufacturing a coil electronic component may further include, before the forming of the first and second plating electrodes on the outer surfaces of the body, forming a surface electrode layer on the mounting surface of the body.

The method of manufacturing a coil electronic component may further include, before the forming of the first and second plating electrodes on the outer surfaces of the body, forming a surface step at an edge of the body at which a surface of the body opposing the mounting surface of the body and the first or second surface meet, and forming an insulating layer on regions of surfaces of the body except for regions of the body on which the first and second plating electrodes are formed.

The method of manufacturing a coil electronic component may further include, before the forming of the first and second plating electrodes on the outer surfaces of the body, forming a marking pattern on the mounting surface of the body or a surface of the body opposing the mounting surface of the body, and forming an insulating layer on regions of surfaces of the body except for regions of the body on which the first and second plating electrodes and the marking pattern are formed.

The forming of the first and second plating electrodes may include forming a first plating layer which is in contact with the first and second lead parts, respectively, and sequentially forming second and third plating layers on the first plating layer.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
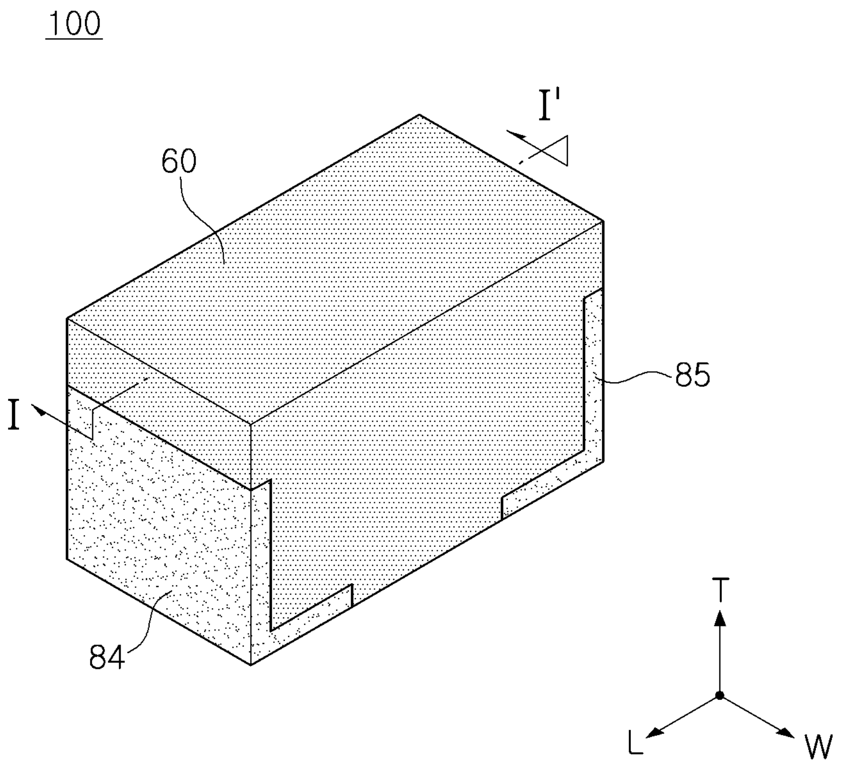
FIG. 1 is a perspective view of a coil electronic component according to an exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Coil Electronic Component

Hereinafter, a coil electronic component according to an exemplary embodiment, particularly, a thin film type inductor will be described. However, the coil electronic component according to the exemplary embodiment is not necessarily limited thereto.

Figure 2:
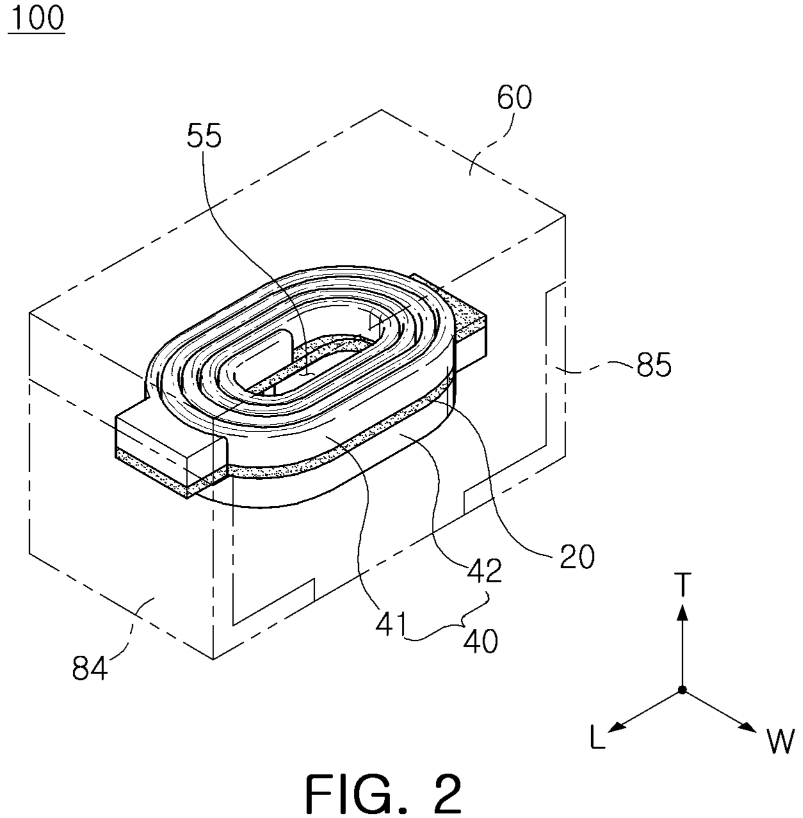
FIG. 2 is a perspective view illustrating the coil electronic component according to an exemplary embodiment in the present disclosure so that coil patterns of the coil electronic component are visible.
Figure 3:
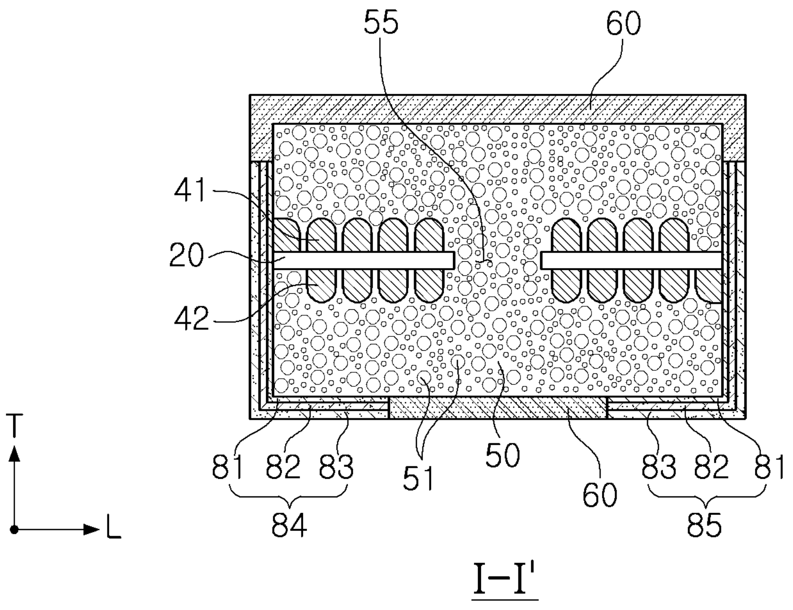
FIG. 3 is a cross-sectional view taken along line I-I' of FIG. 1.

FIG. 1 is a perspective view of a coil electronic component according to an exemplary embodiment, FIG. 2 is a perspective view illustrating the coil electronic component according to an exemplary embodiment so that coil patterns of the coil electronic component are visible, and FIG. 3 is a cross-sectional view taken along line I-I' of FIG. 1.

Referring to FIGS. 1 through 3, a thin film type inductor used in a power line of a power supplying circuit is disclosed as an example of the coil electronic component.

A coil electronic component 100, according to an exemplary embodiment, may include a body 50, a coil 40 buried in the body 50, and plating electrodes 84 and 85 disposed on outer surfaces of the body 50 and connected to the coil 40.

In FIG. 1, in the following description, a "length" direction refers to an "L" direction of FIG. 1, a "width" direction refers to a "W" direction of FIG. 1, and a "thickness" direction refers to a "T" direction of FIG. 1.

The body 50 may contain a magnetic metal material 51.

The magnetic metal material 51 may be a crystalline or amorphous metal containing any one or more selected from the group consisting of iron (Fe), silicon (Si), boron (B), chromium (Cr), aluminum (Al), copper (Cu), niobium (Nb), and nickel (Ni).

For example, the magnetic metal material 51 may be an Fe—Si—B—Cr based amorphous metal, but is not limited thereto.

The metal magnetic material 51 may have a particle diameter of about 0.1 μm to 30 μm, and two or more kinds of magnetic metal materials having different average particle diameters may be mixed together. In a case in which the two or more kinds of magnetic metal materials having different average particle diameters together to be used, a filling rate may be improved to secure high permeability, and efficiency deterioration due to core loss at a high frequency and a high current may be prevented.

The magnetic metal material 51 may be provided in particle form and be dispersed and contained in a thermosetting resin such as an epoxy resin, a polyimide resin, or the like.

The coil 40 may be disposed in the body 50 and may have first and second lead parts respectively exposed to first and second surfaces of the body 50.

The coil 40 may include a first coil pattern 41 formed on one surface of an insulating substrate 20 and a second coil pattern 42 formed on the opposing surface of the insulating substrate 20. Here, the first lead part may be formed to be extended from one end portion of the first coil pattern, and the second lead part may be formed to be extended from one end portion of the second coil pattern.

The first and second coil patterns 41 and 42 may be formed in a spiral shape, and the first and second coil patterns 41 and 42 respectively formed on opposing surfaces of the insulating substrate 20 may be electrically connected to each other through a via (not illustrated) penetrating through the insulating substrate 20.

The first and second coil patterns 41 and 42 may be formed on the insulating substrate 20 by performing electroplating, but are not limited thereto.

The first and second coil patterns 41 and 42 and the via may be formed of a metal having excellent electrical conductivity, such as silver (Ag), palladium (Pd), aluminum (Al), nickel (Ni), titanium (Ti), gold (Au), copper (Cu), platinum (Pt), or alloys thereof.

The first and second coil patterns 41 and 42 may be coated with an insulating film (not illustrated) so as not to be directly in contact with the magnetic material forming the body 50.

The insulating substrate 20 may be, for example, a polypropylene glycol (PPG) substrate, a ferrite substrate, a metal based soft magnetic substrate, or the like.

The insulating substrate 20 may have a through-hole formed in a central portion thereof to penetrate through the central portion thereof, wherein the through-hole may be filled with the magnetic material to form a core part 55. The core part 55 filled with the magnetic material may be formed inside the coil 40 to improve inductance.

Although the coil 40 has been described as having the first and second coil patterns 41 and 42 formed on the insulating substrate 20 by plating with reference to FIGS. 2 and 3, the form of the coil 40 is not limited thereto. For example, any form of the coil 40 may be used as long as it may be disposed in the body to generate magnetic flux by the current applied thereto.

The coil electronic component 100, according to the exemplary embodiment, may include the plating electrodes 84 and 85 formed on outer surfaces of the body 50.

Generally, the external electrodes 84 and 85 of the coil electronic component 100 may be formed of a conductive resin paste including a conductive metal and a resin. Here, as the conductive metal included in the conductive resin paste, silver (Ag) having low specific resistance has mainly been used. However, silver (Ag) has high material cost and frequently causes contact defects with the coil, thereby causing an excessive increase in contact resistance.

Further, in a case in which the external electrodes are formed of the conductive resin paste as described above, since it is difficult to adjust an application thickness of the conductive resin paste, the external electrodes may be formed to be thick, and a volume of the body may be reduced as much as an increased thickness of the external electrodes.

As a result, according to the exemplary embodiment, external electrodes, for instance, the plating electrodes 84 and 85, are formed of the magnetic metal material 51 included in the body 50 by plating, and thus the material cost may be reduced and contact defects between the coil and the external electrodes may be prevented. In addition, since the external electrodes, for instance, the plating electrodes 84 and 85 of the coil electrode component 100 according to the exemplary embodiment are formed on surfaces of the body 50 by direct plating, the thickness of the external electrodes may be easily adjusted, and the external electrodes may be formed to be thinner, thereby increasing the volume of the body 50. As a result, inductance, DC-bias characteristics, efficiency, and the like may be improved.

The plating electrodes 84 and 85 may include a first plating electrode 84 formed on a first surface of the body and a further surface of the body connected to and extending from the first surface of the body, and connected to the first lead part, and a second plating electrode 85 formed on a second surface of the body and a further surface of the body connected to and extending from the second surface of the body, and connected to the second lead part.

For instance, according to the present exemplary embodiment, since the plating electrodes 84 and 85 may be formed on four or fewer surfaces among surfaces of the body 50, cost of manufacturing the plating electrodes may be saved. Also, as the number of surfaces on which the plating electrodes are formed is reduced, space may be secured, thereby further increasing the volume of the body 50.

According to the exemplary embodiment, the first and second surfaces of the body may be disposed to oppose each other while forming end surfaces of the body, and the further surface connected to the first surface, which is the same surface as the further surface connected to the second surface, may be provided as a mounting surface of the coil electrode component.

For instance, the external electrodes 84 and 85 may be formed on only three surfaces among the surfaces of the body 50, and the external electrodes 84 and 85 may not be formed on a surface opposing the mounting surface of the coil electronic component.

In a case in which electronic components are highly integrated in order to satisfy miniaturization of an electronic product, the external electrodes formed on the surface opposing the mounting surface of the coil electronic component 100 and a metal can portion covering the coil electronic component 100 may be in contact with each other, thereby causing a problem such an occurrence of a short circuit, malfunction of the electronic product, or the like.

However, according to the present exemplary embodiment, since the plating electrodes 84 and 85 are not formed on the surface opposing the mounting surface of the body 50, the risk of a short circuit, or the like, may be reduced even if the coil electronic component 100 and the metal can portion covering the coil electronic component 100 are in contact with each other.

According to an exemplary embodiment, the distance in a thickness direction of portions of the first and second plating electrodes formed on the first and second surfaces may be longer than vertical distances between the mounting surface and the respective first and second lead parts.

According to an exemplary embodiment, the distance in the thickness direction of the portions of the first and second plating electrodes formed on the first and second surfaces may be shorter than a thickness of the body.

According to the present exemplary embodiment, since a distance between the metal can portion covering the coil electronic component 100 and the plating electrodes 84 and 85 is further increased, the possibility that the problem such as the occurrence of a short circuit or the like occur may be further reduced.

The first and second plating electrodes 84 and 85 of the coil electronic component 100, according to the exemplary embodiment, may be formed of a conductive material, such as silver (Ag), palladium (Pd), aluminum (Al), nickel (Ni), titanium (Ti), gold (Au), copper (Cu), platinum (Pt), tin (Sn), or alloys thereof.

Since the first and second plating electrodes 84 and 85 may be formed by plating, the first and second plating electrodes 84 and 85 may not include a glass component and a resin.

The first and second plating electrodes 84 and 85 of the coil electronic component 100, according to the exemplary embodiment, may each include a first plating layer which is in contact with the first and second lead parts, and second and third plating layers which are sequentially formed on the first plating layer.

The first, second, and third plating layers may be a copper (Cu) plating layer, a nickel (Ni) plating layer, and a tin (Sn) plating layer, respectively, but are not limited thereto.

The copper (Cu) plating layer is formed as the first plating layer which is directly in contact with the body 50, and thus the material cost may be saved and electrical conductivity may be improved.

By forming the tin (Sn) plating layer as the third plating layer, adhesion between the coil electronic component 100 and the solder when the coil electronic component 100 is mounted on the circuit board may be improved.

By forming the nickel (Ni) plating layer as the second plating layer, connectivity between the Cu plating layer, which is the first plating layer, and the Sn plating layer, which is the third plating layer, may be improved.

According to an exemplary embodiment, an insulating layer 60 may be formed on surfaces of the body 50, and the insulating layer 60 may be formed on regions except for regions on which the first and second plating electrodes 84 and 85 are formed.

According to the present exemplary embodiment, an occurrence of plating blur in a region except for the regions on which the external electrodes 84 and 85 are formed may be prevented.

Figure 4:
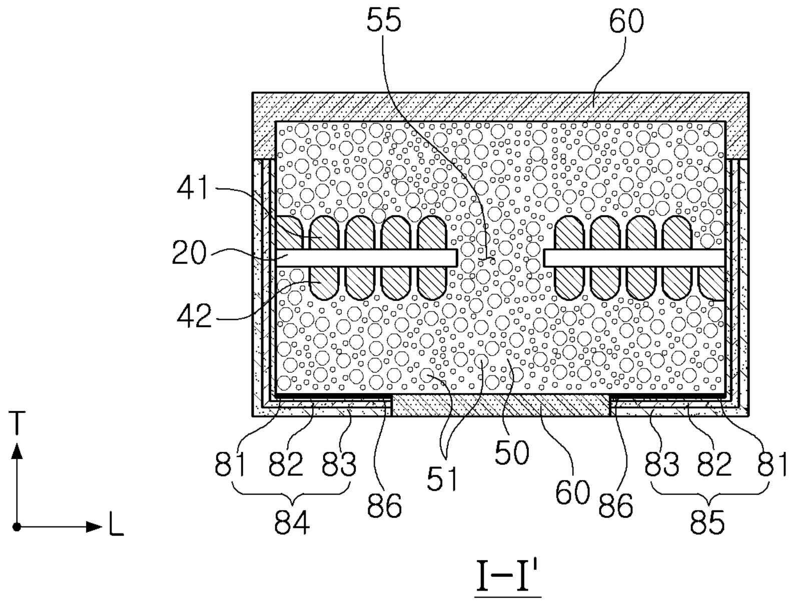
FIG. 4 is a cross-sectional view of a coil electronic component according to another exemplary embodiment in the present disclosure in a length-thickness (LT) direction of the coil electronic component.

FIG. 4 is a cross-sectional view of a coil electronic component according to another exemplary embodiment in a length-thickness (LT) direction of the coil electronic component.

Referring to FIG. 4, the coil electronic component 100, according to another exemplary embodiment, may further include a surface electrode layer 86 formed on the mounting surface of the body 50.

The surface electrode layer 86 may be formed on a portion of the mounting surface of the body 50 to further improve fixing strength of the plating electrodes 84 and 85 formed on the mounting surface.

The surface electrode layer 86 may be formed by applying a conductive paste by a printing method or by a thin film process such as sputtering, or the like, but is not limited thereto.

The surface electrode layer 86 may be formed of a metal having excellent electrical conductivity, such as silver (Ag), palladium (Pd), aluminum (Al), nickel (Ni), titanium (Ti), gold (Au), copper (Cu), platinum (Pt), or alloys thereof, etc.

In a case in which the surface electrode layer 86 is formed, the fixing strength of the plating electrodes 84 and 85 when the coil electronic component 100 is mounted on the circuit board may be further improved, but in a case in which there is no need to improve the fixing strength of the plating electrodes 84 and 85, there is no need to form the surface electrode layer 86.

In the coil electronic component 100 according to the exemplary embodiment, even though the surface electrode layer 86 is not formed, the external electrodes may be formed by the magnetic metal material 51 included in the body 50 by plating, and particularly, widths in which the external electrodes are extended to the mounting surface may be adjusted by adjusting the region on which the insulating layer 60 is formed.

In other words, in the coil electronic component 100 according to the exemplary embodiment, even if the surface electrode layer 86 is not formed, it may not be difficult to form the external electrodes by plating.

Configurations overlapping those of the coil electronic component according to the exemplary embodiment described above except for the configuration of the surface electrode layer 86 may be similarly applied.

Figure 5:
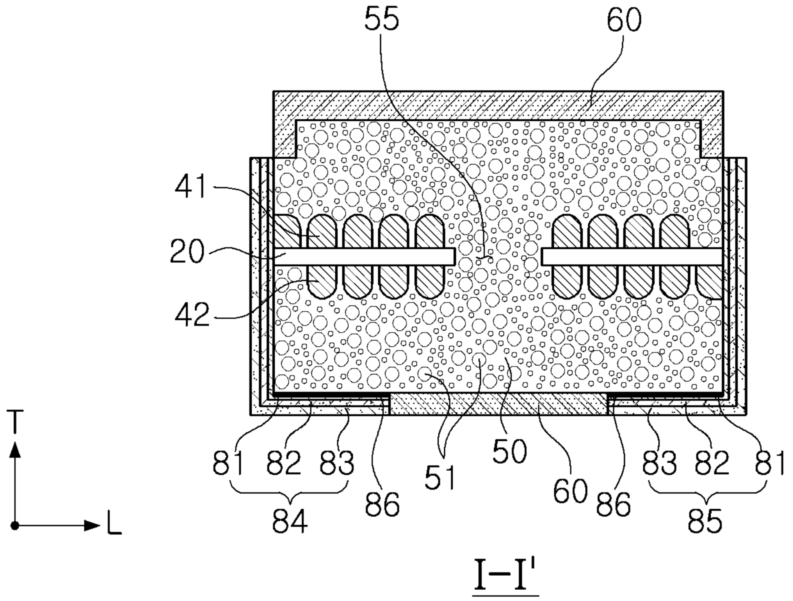
FIG. 5 is a cross-sectional view of a coil electronic component according to another exemplary embodiment in the present disclosure in a length-thickness (LT) direction of the coil electronic component.

FIG. 5 is a cross-sectional view of a coil electronic component according to another exemplary embodiment in a length-thickness (LT) direction of the coil electronic component.

Referring to FIG. 5, the coil electronic component 100 according to another exemplary embodiment may have a surface step formed at an edge of the body 50 at which a surface of the body 50 opposing the mounting surface of the body 50 and the first or second surface meet.

According to the present exemplary embodiment, the risk of a short circuit, or the like, between the portions of the first and second plating electrodes 84 and 85, formed on the first and second surfaces, and the metal can portion covering the coil electronic component 100 may be further reduced.

Configurations overlapping those of the coil electronic component according to the exemplary embodiment described above except for the configuration of the surface step may be similarly applied.

Figure 6:
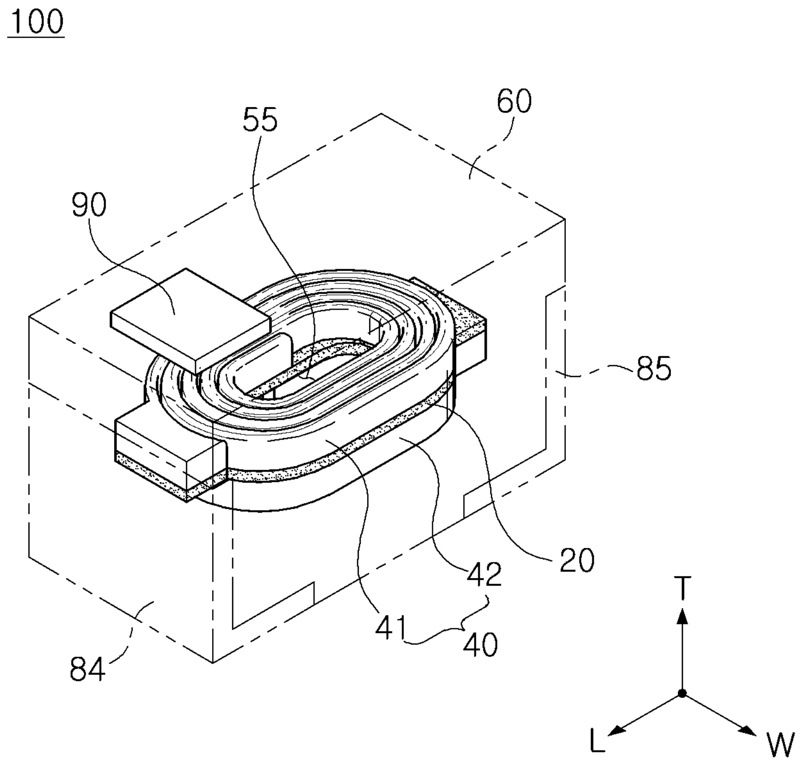
FIG. 6 is a perspective view illustrating a coil electronic component according to another exemplary embodiment in the present disclosure so that coil patterns of the coil electronic component are visible.

FIG. 6 is a perspective view illustrating a coil electronic component according to another exemplary embodiment so that coil patterns of the coil electronic component are visible.

Referring to FIG. 6, the coil electronic component 100, according to another exemplary embodiment, may include a marking pattern 90 formed on the mounting surface of the body 50 or the surface opposing the mounting surface of the body 50. In this case, the insulating layer 60 may be formed on regions of the outer surface of the body 50 except for regions on which the first and second plating electrodes 84 and 85 and the marking pattern 90 are formed.

The marking pattern 90 is provided so that directionality may be recognized. Although FIG. 6 illustrates a case in which the marking pattern 90 is positioned on the surface opposing the mounting surface of the body 50 while having a quadrangular shape, the shape and the position of the making pattern 90 are not limited to those illustrated in FIG. 6.

Configurations overlapping with those of the coil electronic component according to the exemplary embodiment described above except for the configuration of the marking pattern 90 may be similarly applied.

Method of Manufacturing a Coil Electronic Component

Hereinafter, a method of manufacturing coil electronic component 100 according to an exemplary embodiment will be described.

First, the coil 40 may be formed.

After a via hole is formed in the insulating substrate 20 and a plating resist having an open part is formed on the insulating substrate 20, the via hole and the open part may be filled with a conductive metal by plating to form the first and second coil patterns 41 and 42, and a via 46 connecting the first and second coil patterns 41 and 42 to each other.

The first and second coil patterns 41 and 42 and the via 46 may be formed of a conductive metal having excellent electrical conductivity, such as silver (Ag), palladium (Pd), aluminum (Al), nickel (Ni), titanium (Ti), gold (Au), copper (Cu), platinum (Pt), or alloys thereof.

However, a method of forming the coil 40 is not necessarily limited to the plating process as described above, and the coil may be formed of a metal wire. For example, any coil may be used as long as it is formed in the body to generate magnetic flux by current applied thereto.

An insulating film (not illustrated) coating the first and second coil patterns 41 and 42 may be formed on the first and second coil patterns 41 and 42.

The insulating film (not illustrated) may be formed by a known method such as a screen printing method, an exposure and development process of a photo-resist (PR), a spray applying process, or the like.

A central portion of a region of the insulating substrate 20 on which the first and second coil patterns 41 and 42 are not formed may be removed to form a core part hole.

The insulating substrate 20 may be removed by performing mechanical drilling, laser drilling, sandblasting, a punching process, or the like.

Next, the body 50 may be formed by laminating magnetic sheets including the magnetic metal material 51 on an upper portion and a lower portion of the first and second coil patterns 41 and 42.

The magnetic sheets may be manufactured in a sheet shape by preparing slurry by mixtures of the magnetic metal material 51, and organic materials such as a thermosetting resin, a binder, a solvent, and the like, applying the slurry at a thickness of several tens of micrometers onto carrier films by a doctor blade method, and then drying the slurry.

The magnetic sheets may have a form in which the magnetic metal material 51 provided in particle form is dispersed in the thermosetting resin such as an epoxy resin, a polyimide resin, or the like.

The body 50 in which the coil 40 is embedded may be formed by laminating, compressing, and curing the magnetic sheets.

Here, the core part hole may be filled with a magnetic material to form a core part 55.

As the method of manufacturing a coil electronic component of the coil electronic component according to the exemplary embodiment, a process of laminating the magnetic sheets to form the body 50 in which the coil 40 is embedded has been described, but the method of manufacturing a coil electronic component is not necessarily limited thereto. For example, any method may be used as long as it may form a magnetic metal material-resin composition in which the coil is embedded.

Figure 7A:
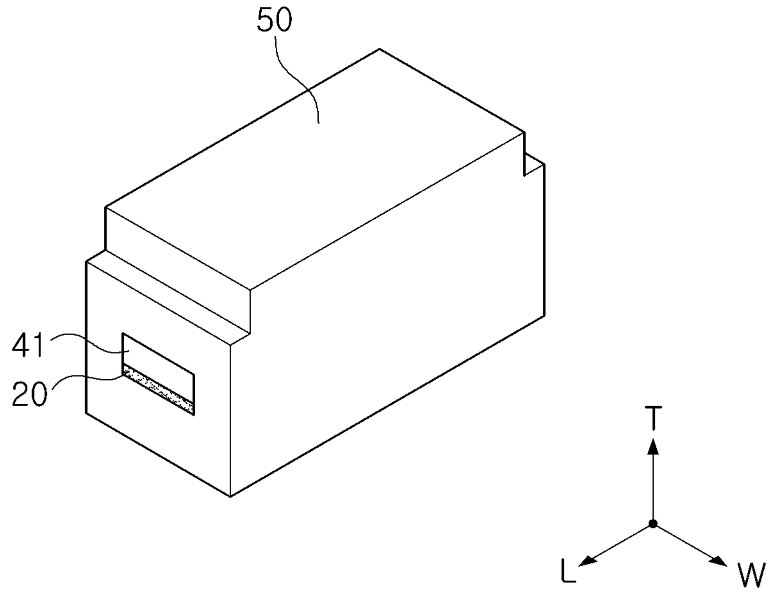
FIGS. 7A through 7C are views illustrating a process of forming plating electrodes of a coil electronic component according to an exemplary embodiment in the present disclosure.
Figure 7B:
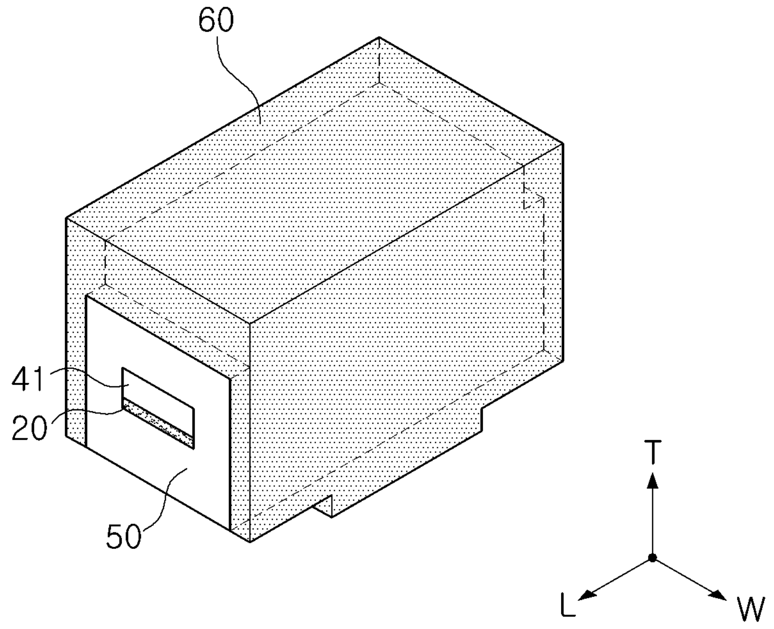
Figure 7C:
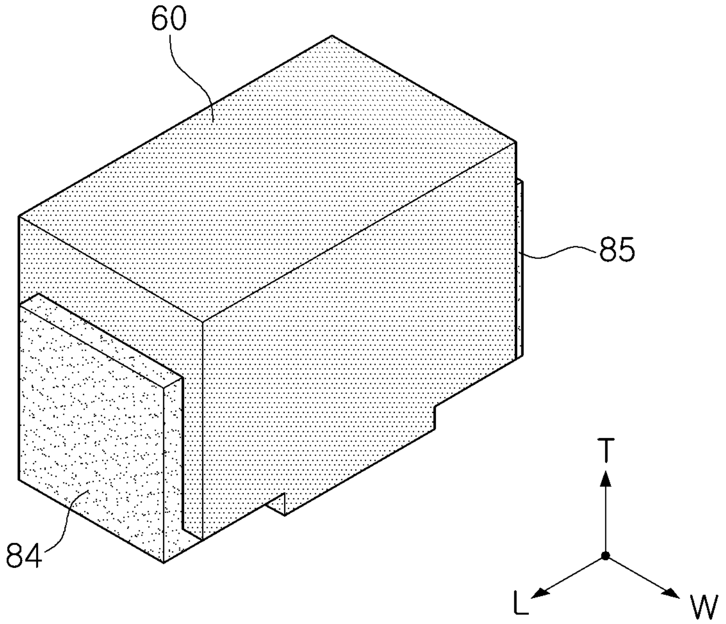

FIGS. 7A through 7C are views illustrating a process of forming plating electrodes 84 and 85 of a coil electronic component according to an exemplary embodiment.

Referring to FIG. 7A, the surface step may be formed at the edge of the body at which the surface opposing the mounting surface of the body and the first or second surface meet.

According to the exemplary embodiment, the problem such as an occurrence of a short circuit between the plating electrodes 84 and 85 and the coil electronic component 100, or the like, may be prevented by the surface step.

Referring to FIG. 7B, the insulating layer 60 may be formed on the regions of the surface of the body 50 except for the regions on which the plating electrodes are formed.

When the plating electrodes of the coil electronic component 100 according to the exemplary embodiment are formed, in a case in which the body 50 including the magnetic metal material 51 is plated as it is, an overall surface of the body 50 as well as the regions on which the plating electrodes 84 and 85 are formed may be plated.

Thus, when the plating to form the external electrodes is performed, there is a need to prevent the regions except for the regions on which the plating electrodes 84 and 85 are formed from being plated by the magnetic metal material.

Therefore, according to an exemplary embodiment, before forming the first and second plating electrodes 84 and 85 on the surface of the body 50 by plating, the insulating layer 60 is formed on the regions except for the region on which the first and second plating electrodes 84 and 85 are formed and the plating is then performed, and thus an occurrence of a plating blur on the regions except for the region on which the plating electrodes are formed may be prevented.

Referring to FIG. 7C, the first and second plating electrodes 84 and 85 may be formed by plating the surface of the body 50 on which the insulating layer 60 is not formed.

According to an exemplary embodiment, the first and second plating electrodes 84 and 85 may be formed by directly plating the surface of the body 50 by the magnetic metal material 51 included in the body 50.

Meanwhile, the method of manufacturing the coil electronic component may further include an operation of forming a surface electrode layer 86 on the mounting surface of the body, before forming the first and second plating electrodes on the outer surface of the body.

In addition, the method of manufacturing the coil electronic component may further include an operation of forming a marking pattern 90 on the mounting surface of the body or the other surface of the body opposing the mounting surface of the body, before forming the first and second plating electrodes on the outer surface of the body. In this case, the insulating layer may be formed on a region of the surface of the body except for regions on which the first and second plating electrodes and the marking pattern are formed.

A description of features overlapping with those of the coil electronic component according to the exemplary embodiment described above except for the above-mentioned description will be omitted.

As set forth above, according to the exemplary embodiments in the present disclosure, contact defects between the coil and the external electrodes is effectively suppressed, and thus an excessive increase in contact resistance may be prevented. Further, inductance, DC-bias characteristics efficiency, and the like may be improved by increasing the volume of the body.

While exemplary embodiments have been shown and described above, it will be apparent to those skilled in the art that modifications and variations could be made without departing from the scope of the present invention as defined by the appended claims.

What is claimed is:

1. A coil electronic component comprising:

a body including a magnetic metal material;

an insulating substrate disposed in the body;

a coil disposed on at least one surface of the insulating substrate and in the body, and having first and second lead parts respectively outwardly exposed to first and second surfaces of the body;

a first plating electrode disposed on at least a portion of the first surface of the body and on at least a portion of a further surface of the body connecting the first surface and the second surface, and connected to the first lead part;

a second plating electrode disposed on at least a portion of the second surface of the body and on at least another portion of the further surface of the body, and connected to the second lead part; and an insulating layer disposed on the further surface of the body except for regions of the further surface of the body on which the first and second plating electrodes are disposed, wherein at least a portion of the first plating electrode or the second plating electrode directly contacts the magnetic metal material, each of the first and second plating electrodes comprises plural plating layers including a first plating layer which is in direct contact with the insulating layer, and each of the plural plating layers included in at least one of the first and second plating electrodes is in contact with a side surface of the insulating layer.

2. The coil electronic component of claim 1, wherein the first and second surfaces are end surfaces of the body that oppose each other, and the further surface of the body is a mounting surface of the coil electronic component.

3. The coil electronic component of claim 2, wherein respective distances in a thickness direction of the first and second plating electrodes on the first and second surfaces are longer than respective vertical distances between the mounting surface and the first and second lead parts.

4. The coil electronic component of claim 3, wherein each of the respective distances in a thickness direction of the first and second plating electrodes on the first and second surfaces is shorter than a thickness of the body.

5. The coil electronic component of claim 2, wherein a surface step is at an edge of the body at which a surface opposing the mounting surface and the first or second surface meet.

6. The coil electronic component of claim 2, further comprising a surface electrode layer on the mounting surface of the body.

7. The coil electronic component of claim 2, further comprising:

a marking pattern on the mounting surface of the body or a surface opposing the mounting surface of the body, wherein the insulating layer is entirely disposed on regions of outer surfaces of the body except for regions of the body on which the first and second plating electrodes and the marking pattern are formed.

8. The coil electronic component of claim 1, wherein the insulating layer is entirely disposed on regions of outer surfaces of the body except for regions of the body on which the first and second plating electrodes are formed.

9. The coil electronic component of claim 1, wherein the first plating layer includes copper (Cu), and contacts the body and one of the first and second lead parts.

10. The coil electronic component of claim 9, wherein each of the first and second plating electrodes further includes a second plating layer disposed on and contacting the first plating layer and includes a third plating layer disposed on and contacting the second plating layer, and the first, second, and third plating layers have different compositions.

11. The coil electronic component of claim 10, wherein the second plating layer includes nickel (Ni).

12. The coil electronic component of claim 10, wherein the third plating layer includes tin (Sn).

* * * * *